Oct. 21, 1930.

A. G. BORDEN

PERMANENT HAIR WAVING APPLIANCE

Re. 17,832

Original Filed March 21, 1928

INVENTOR.

Arthur G. Borden,

BY John B. Brady

ATTORNEY.

Reissued Oct. 21, 1930 Re. 17,832

UNITED STATES PATENT OFFICE

ARTHUR G. BORDEN, OF WASHINGTON, DISTRICT OF COLUMBIA, ASSIGNOR TO THE BORDEN METHOD INCORPORATED, A CORPORATION OF DELAWARE

PERMANENT-HAIR-WAVING APPLIANCE

Original No. 1,681,024, dated August 14, 1928, Serial No. 263,493, filed March 21, 1928. Application for reissue filed August 29, 1929. Serial No. 389,310.

My invention relates broadly to hair waving appliances and more particularly to a device for wrapping hair in an electric heating appliance for curling operations.

This application is a continuation in part of my application Serial No. 203,328, filed July 5, 1927, for hair waving appliance.

One of the objects of my invention is to provide a construction of winding device for hair waving appliances by which the hair of a patron may be wrapped within a heater in an improved manner by which a permanent wave may be imparted to the hair.

Another object of my invention is to provide a construction of winder for back wrapping the hair within an electric heater during curling operation in such manner that a permanent wave may be imparted to the hair more nearly resembling natural wavy hair.

Still another object of my invention is to provide a construction of winding device for hair wavers where the winding device is provided with an outwardly extending wall and slot with an arm extending integrally from the wall for guiding the strands of hair in a flat ribbon-like formation to a position by which the hair may be tightly wrapped and stretched upon a rod member within the heater, the hair being held in necessary position during the heating operation.

A further object of my invention resides in the construction of a winder having a substantially cylindrical upper portion and an outwardly flared lower portion terminating in an arm by which strands of hair may be guided through a notch and back wrapped upon a rod member as the winder is advanced axially with respect to the rod.

A still further object of my invention is to provide a winding device formed of heat resisting material enabling the strands of hair to be wrapped in the heated chamber and the strands controlled by a heat resisting winding member which does not tend to absorb and retain heat by reason of its close proximity to the side walls of the heater, but remains sufficiently cool so as not to overheat and ruin the ends or dryer portions of the hair, allowing the strands of hair to be handled as may be required for curling operations.

Figure 1:
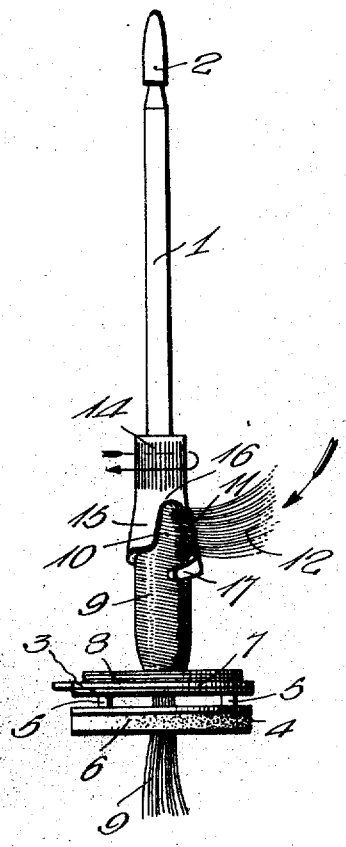
Figure 2:
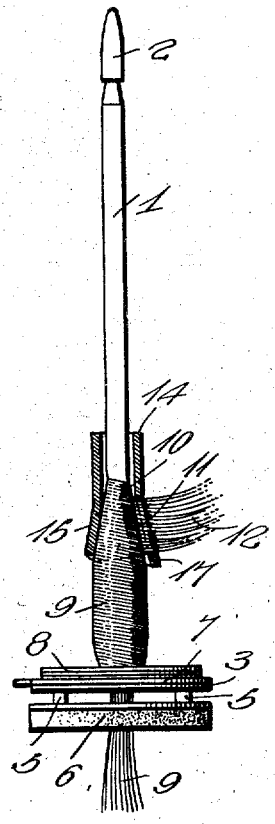
Figure 3:
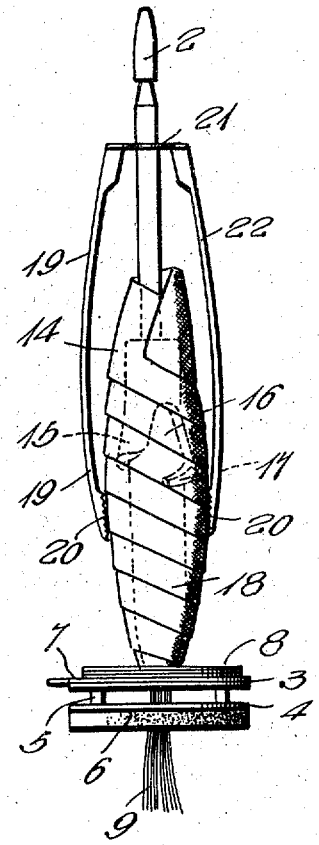
Figure 4:
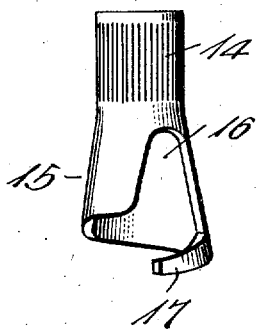
Figure 5:
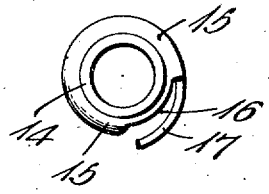

My invention further resides in the structure of integrally formed hair curling device for heaters as described more fully in the specification hereinafter following by reference to the accompanying drawings, in which:

Figure 1 is a side elevation showing the hair curling device of my invention in a position for wrapping the hair around the central rod member of the heater; Fig. 2 is a cross-sectional view through the hair wrapping appliance; Fig. 3 is a side elevation partially broken away to show the interior arrangement of the wrapped hair winder and protective covering and device for maintaining the protective covering over the protective wrapping in the hair waving appliance of my invention; Fig. 4 is an enlarged side elevation of the heat resisting winder for the hair waving appliance of my invention; and Fig. 5 is a top plan view of the winder shown in Fig. 4.

I have found that in order to properly impart waves to the hair, the hair should be back wrapped upon itself in the heating appliance and then carefully protected from uneven heating, especially for the ends or dryer portions of the hair. The appliance of my invention includes a type of winder formed from an integral piece of heat resisting material where the strands of hair may be back wrapped or over wrapped along a central rod and thereafter covered by a protective wrapping which is maintained in position during the curling process. The winding device is formed from a single piece of heat resisting material substantially cylindrical throughout one portion of its length and conical shaped throughout another portion of its length with a substantially V shaped notch cut therein and tapering to opposite walls of the device and terminating in an arm forming means for guiding the hair to over wrapped or back wrapped position upon the central retaining rod.

Referring to the drawings in more detail reference character 1 designates the central rod member, or mandrel on which the hair is wound for effecting a hair waving operation, having a head 2 at one end thereof and secured to the heat resisting plate member 3 at the opposite end thereof.

The plate member 3 is spaced from another heat resisting plate member 4 by heat resisting members 5. A soft pad such as felt 6 is carried by the plate member 4. A plate member 7 is mounted for angular movement on plate member 3 and provides a support for the fibrous washer members 8 which form a tight closure with respect to the heating chamber and serve to absorb condensation which might otherwise leak upon the head of a patron during the hair curling operation. The strands of hair are represented at 9 as extending from the head of a patron through an aperture in pad 6, a corresponding aperture in plate 4, a corresponding aperture in plate 3 and an aperture in plate 7 which may be aligned with the other apertures or shifted with respect thereto for locking the strands of hair in the heater chamber. The winder is represented at 14 as having an upper cylindrical portion which may be serrated or roughened to permit the winder to be readily twisted by the fingers of the attendant. The lower portion of the winder is substantially conical shaped as represented at 15. A substantially V shaped notch is provided in the conical shaped walls of the winder as represented at 16. An integrally extending arm 17 is provided at the lower extremity of the notch 16 serving as a means of guiding the strands of hair 9 into the notch 16 and upon the rod 1. The strands of hair 9 are shown curled upon the rod at 10 in such a position that the next succeeding layer 11 is over wrapped upon the strands at 10. The strands of hair represented at 12 are back wrapped upon the strands of hair already wrapped upon the rod to a final position illustrated in Fig. 3. Thereafter, a protective cloth strip 18 is wrapped over the hair and maintained in place by means of a guard constituted by two downwardly depending arms 19 and 22. These arms are formed from heat resisting material and are provided with gripping faces 20. A bridge 21 interconnects the heat resisting side strips 19 and 22 and embraces the rod 1. The assembled appliance is then covered by the heating chamber shown more clearly in my application hereinbefore referred to, and the hair in its wrapped condition subjected to the indirect influence of heat over a predetermined period of time.

I have found the hair curling device of my invention extremely practical and successful in its use and inexpensive in its manufacture.

It will be observed that the hair curling device may be molded from heat resisting material into a single integral member and that metallic parts are not used in the curling device.

While I have described my invention in certain of its preferred embodiments, I desire that it be understood that modifications may be made and that no limitations upon my invention are intended other than are imposed by the scope of the appended claims.

What I claim as new and desire to secure by Letters Patent of the United States is as follows:

1. In a hair waving appliance a winder comprising a rod member, a heat resisting device concentrically positioned for rotative and longitudinal movement on said rod member, said device having a substantially cylindrical portion, a frusto-conical portion extending therefrom and a tongue projecting from said frusto-conical portion and a notch therein extending longitudinally of said device for receiving strands of hair and guiding said hair in a spiral along said rod member preparatory to subjecting the hair in wound formation to heat.

2. In a hair waving appliance a winder comprising a rod member, a tubular device of heat resisting qualities concentrically positioned upon said rod member for rotative and longitudinal movement thereon, said device having a substantially cylindrical portion and a substantially frusto-conical portion extending therefrom and a laterally extending tongue of heat-resisting material at the lower extremity of said frusto-conical portion and having a notch extending longitudinally along said device from said tongue for receiving strands of hair and guiding said hair upon said rod member in a spiral along said rod member preparatory to subjecting said hair to heat.

3. In a hair waving appliance, a winder comprising a rod member, a tubular heat-resisting device concentrically positioned for rotative and longitudinal movement upon said rod member, said heat resisting device having a cylindrical portion and a substantially frusto-conical portion, a tongue of heat resisting material extending from the frusto-conical surface of said device and forming a guide for receiving strands of hair and a substantially V-shaped notch extending longitudinally of said tubular device away from said tongue for receiving strands of hair and guiding said hair in overwrapped position upon said rod member in accordance with the rotative and longitudinal movement of said device along said rod member.

4. In a hair waving appliance a winder comprising a rod member, a cylindrical heat resisting device concentrically positioned for rotative and longitudinal movement on said rod member, one end of said device being flared outwardly, and heat resisting means carried by the outwardly flared end of said device for engaging strands of hair and guiding the strands of hair in overwrapped relation upon said rod member.

5. In a hair waving appliance, a winder comprising a rod member, a tubular device concentrically positioned for rotative and longitudinal movement over said rod member, said device being formed from fibrous material, substantially cylindrical at one end and flared outwardly at the other end, and having a notch therein for engaging strands of hair and guiding said strands of hair in overwrapped formation upon said rod member preparatory to subjecting said hair to heat.

6. In a hair waving appliance a winder comprising a mandrel, a tubular device concentrically positioned for rotative and slidable movement with respect to said mandrel, said device having the interior surface thereof inclined outwardly with respect to the axis of said mandrel, the said outwardly inclined surface having a longitudinally extending notch formed therein and a tongue extending in a direction transverse of the axis of said notch for guiding strands of hair into said notch in wrapped engagement upon said mandrel.

7. In a hair waving appliance a winder comprising a mandrel, a device concentrically positioned for rotative and slidable movement with respect to said mandrel, said device having the walls thereof disposed at an angle with respect to the axis of said mandrel, and means connected with said wall for engaging strands of hair and guiding the strands of hair in wrapped engagement upon said mandrel.

8. In a hair waving appliance a winder comprising a rod member, a cylindrical device concentrically positioned for rotative and longitudinal movement on said rod member, one end of said device being flared outwardly and means carried by the outwardly flared end of said device for engaging strands of hair and guiding the strands of hair in overwrapped relation upon said rod member.

9. In a hair waving appliance, a winder comprising a mandrel, a device concentrically positioned for rotative and longitudinal movement with respect to said mandrel, said device having a substantially cylindrical portion, a frusto-conical portion extending therefrom and a tongue projecting from said frusto-conical portion and a notch therein extending longitudinally of said device for receiving strands of hair and guiding said hair in a spiral along said mandrel preparatory to subjecting the hair in wound formation to heat.

10. In a hair waving appliance a mandrel for receiving hair in wrapped formation for effecting a hair waving operation, a member slidable and rotatable with respect to said mandrel, said member having the lower portion of the interior walls thereof disposed at an angle with respect to the axis of said mandrel, said member having a longitudinally extending notch in one side thereof and a tongue extending from said member adjacent one side of the notch therein for guiding strands of hair into said notch and directing the strands of hair in wrapped formation upon said mandrel under conditions of rotatable and longitudinal movement of said member.

ARTHUR G. BORDEN.